(12) United States Patent
Krishnamurthy

(10) Patent No.: US 11,109,465 B2
(45) Date of Patent: Aug. 31, 2021

(54) DETERMINING PRESENCE AND ABSENCE

(71) Applicant: WOKPLACE FABRIC LIMITED, Hemel Hempstead (GB)

(72) Inventor: Raj Krishnamurthy, Buckinghamshire (GB)

(73) Assignee: WORKPLACE FABRIC LIMITED, Hemel Hempstead (GB)

( * ) Notice: Subject to any disclaimer, the term of this patent is extended or adjusted under 35 U.S.C. 154(b) by 138 days.

(21) Appl. No.: 16/473,636

(22) PCT Filed: Jan. 8, 2018

(86) PCT No.: PCT/GB2018/050032
§ 371 (c)(1),
(2) Date: Jun. 26, 2019

(87) PCT Pub. No.: WO2018/130814
PCT Pub. Date: Jul. 19, 2018

(65) Prior Publication Data
US 2021/0049893 A1     Feb. 18, 2021

(30) Foreign Application Priority Data

Jan. 10, 2017 (GB) .................................... 1700369

(51) Int. Cl.
*H05B 47/105* (2020.01)
*G08B 21/22* (2006.01)
*H04L 1/18* (2006.01)
*H04W 24/10* (2009.01)
*H04W 36/30* (2009.01)

(52) U.S. Cl.
CPC .......... *H05B 47/105* (2020.01); *G08B 21/22* (2013.01); *H04L 1/188* (2013.01); *H04W 24/10* (2013.01); *H04W 36/30* (2013.01)

(58) Field of Classification Search
CPC ......... G08B 21/22; H04L 1/188; H04L 24/10; H04L 36/30
See application file for complete search history.

(56) References Cited

U.S. PATENT DOCUMENTS

| | | |
|---|---|---|
| 6,359,564 B1 | 3/2002 | Thacker |
| 2010/0102760 A1 | 4/2010 | Reid et al. |
| 2012/0229278 A1 | 9/2012 | Roosli |
| 2016/0011053 A1 | 1/2016 | Katz |

OTHER PUBLICATIONS

International Patent Application No. PCT/GB2018/050032; Int'l Written Opinion and Search Report; dated Apr. 3, 2018; 9 pages.
Great Britain Patent Application No. 1700369.0; Combined Search and Examination Report; dated May 11, 2018; 8 pages.

*Primary Examiner* — Ronald B Abelson
(74) *Attorney, Agent, or Firm* — BakerHostetler

(57) ABSTRACT

An apparatus and method for determining presence and absence of one or more individuals in an occupancy space. The apparatus comprises a processing apparatus and a memory, the memory being configured for storing data indicating that expiry of a timer was responded to, and data indicating that a signal from a sensor was responded to. The processing apparatus has a number of modes in which it is responsive to a signal from a sensor and/or responsive to expiry of a timer so as to determine presence and absence.

19 Claims, 2 Drawing Sheets

DETERMINING PRESENCE AND ABSENCE

CROSS-REFERENCE TO RELATED APPLICATIONS

This application is the National Stage of International Patent Application No. PCT/GB2018/050032, filed Jan. 8, 2018, which claims priority to Great Britain Patent Application No. 1700369.0, filed Jan. 10, 2017, the entire disclosures of both of which are incorporated herein by reference for any and all purposes.

FIELD

This specification relates to methods and apparatus for determining presence and absence of one or more individuals in an occupancy space. The occupancy space may be located in a work environment such as an office.

BACKGROUND

Detection and knowledge of occupancy levels in office spaces is the first step in improving overall utilisation of real estate assets. With real estate costs rocketing in cities like London, this activity has become of ongoing relevance. Further, with the advent of modern communications technology, a knowledge worker can work at any location using their computation and communication tools. The focus has shifted to providing suitable environments in the workplace so that workers can flexibly locate themselves in a space of their choosing. With spaces distributed across a large real estate it can be difficult to show users where the available space is.

A known method for sensing presence of a human being at an occupancy location is based on passive infra red (PIR) motion detection. A PIR detector can determine start of presence at a location, but it can be difficult to establish exactly when the end of presence has happened. An approach that has been taken is to measure for presence periodically, i.e. a PIR motion sensor is pulsed every so often to check for presence. If presence is detected within a fixed duration, a presence signal is sent to a monitoring server. If no presence is detected in a fixed duration, a no-presence signal is sent to the monitoring server.

SUMMARY

In a first aspect, this specification describes a method of operating an apparatus to determine presence and absence of one or more individuals in an occupancy space.

The apparatus may comprise a processing apparatus having a number of modes. In each mode the processing apparatus is responsive to at least one of a signal from a sensor and expiry of a timer. In one mode, the processing apparatus may be responsive to both a signal from a sensor and expiry of a timer. In another mode, the processing apparatus may be responsive to expiry of a timer only.

The processing apparatus may be configured to store data in first and second variables, the first variable being adapted to store an indication of whether the processing apparatus responded to a signal from a sensor or to expiry of a timer, and the second variable being adapted to store an indication of whether, at an earlier time, the processing apparatus responded to a signal from a sensor or to expiry of a timer.

The method may comprise performing a first set of operations if the processing apparatus responds to a signal from a sensor, and performing a second set of operations if the processing apparatus responds to expiry of a timer.

The first set of operations may include causing data indicating a detected presence to be transmitted and/or stored, if data in the second variable indicates that the processing apparatus previously responded to expiry of a timer.

The first set of operations may further comprise storing, in the second variable, data stored in the first variable, and storing, in the first variable, data indicating that a signal from a sensor was responded to.

The first set of operations may further comprise entering a mode in which the processing apparatus is responsive to expiry of a timer. In this mode, the processing apparatus may ignore (i.e. may not respond to) a signal from the sensor.

The method may comprise causing the apparatus to transmit and/or store data indicating a detected absence, if:
  the processing apparatus responds to a expiry of a timer; and
  data stored in the first variable indicates that the processing apparatus last responded to expiry of a timer.

The second set of operations may comprise:
if data in the first variable indicates that a signal from a sensor was responded to, then:
  storing, in the second variable, data stored in the first variable;
  storing, in the first variable, data indicating that expiry of a timer was responded to; and
  entering a mode in which the processing apparatus is responsive to a signal from a sensor and responsive to expiry of a timer.

The second set of operations may further comprise:
if data in the first variable indicates that expiry of a timer was responded to, then:
  storing, in the second variable, data stored in the first variable;
  storing, in the first variable, data indicating that expiry of a timer was responded to;
  causing data indicating an absence to be transmitted and/or stored; and
  entering a mode in which the processing apparatus is responsive to a signal from a sensor. In this mode the processing apparatus may also be responsive to expiry of a timer, but the duration of this timer may be set so that it does not expire until the end of the current operational period.

The method may further comprise storing first data in the first variable if the processing apparatus has responded to expiry of a timer, and storing second data, different from the first data, in the first variable if the processing apparatus has responded to a signal from a sensor, wherein the first variable and second variable are initialised such that the first and second variable each comprise the first data.

The data indicating a presence and/or data indicating an absence may be transmitted to a remote server.

In a second aspect, this specification describes an apparatus configured to perform the method described above with reference to the first aspect.

In a third aspect, this specification describes an apparatus for determining presence and absence of one or more individuals in an occupancy space, the apparatus comprising a processing apparatus having a number of modes. In each mode the processing apparatus is responsive to at least one of: a signal from a sensor and expiry of a timer. The processing apparatus is configured to store data in a first variable to indicate whether the processing apparatus responded to a signal from a sensor or expiry of a sensor, and to store data in a second variable to indicate whether the processing apparatus responded, at an earlier time, to a signal from a sensor or to expiry of a timer.

The processing apparatus may be configured to perform a first set of operations if the processing apparatus responds to a signal from a sensor, and to perform a second set of operations if the processing apparatus responds to expiry of a timer. The first set operations may include causing data indicating a detected presence to be transmitted, if data in the second variable indicates that expiry of a timer was responded to.

The apparatus may comprise a memory in which the data in the first and second variables is stored. The processing apparatus may be coupled to the memory and may be operable to read/write data to/from the memory.

The apparatus may comprise a communication device configured for transmitting data indicating a detected presence or a detected absence to a remote server.

The processing apparatus may comprise a microprocessor.

The apparatus may comprise a sensor. The sensor may comprise a passive infrared detector.

In a fourth aspect, the present specification describes a method of operating a processing apparatus to determine presence and absence of one or more individuals in an occupancy space, the processing apparatus having a number of modes and being configured to store data in first and second variables, the method comprising:
  determining if the processing apparatus has responded to a signal from a sensor, and if it has:
    transmitting data indicating a detected presence, if data in the second variable indicates that expiry of a timer was responded to;
    storing, in the second variable, data stored in a first variable;
    storing, in the first variable, data indicating that a signal from a sensor was responded to; and
    entering a mode in which the processing apparatus is responsive to expiry of a timer;
  determining if the processing apparatus has responded to expiry of a timer, and if it has:
    if data in the first variable indicates that a signal from a sensor was responded to, then:
      storing, in the second variable, data stored in the first variable;
      storing, in the first variable, data indicating that expiry of a timer was responded to; and
      entering a mode in which the processing apparatus is responsive to a signal from a sensor and responsive to expiry of a timer;
    if data in the first variable indicates that expiry of a timer was responded to, then:
      storing, in the second variable, data stored in the first variable;
      storing, in the first variable, a data indicating that expiry of a timer was responded to;
      transmitting data indicating an absence; and
      entering a mode in which the processing apparatus is responsive to a signal from a sensor.

In a fifth aspect, this specification describes an apparatus configured to perform the method described above with reference to the fourth aspect.

BRIEF DESCRIPTION OF THE DRAWINGS

In order that the invention may be more fully understood, embodiments thereof will now be described by way of example only, with reference to the accompanying figures, in which.

DETAILED DESCRIPTION

Figure 1:
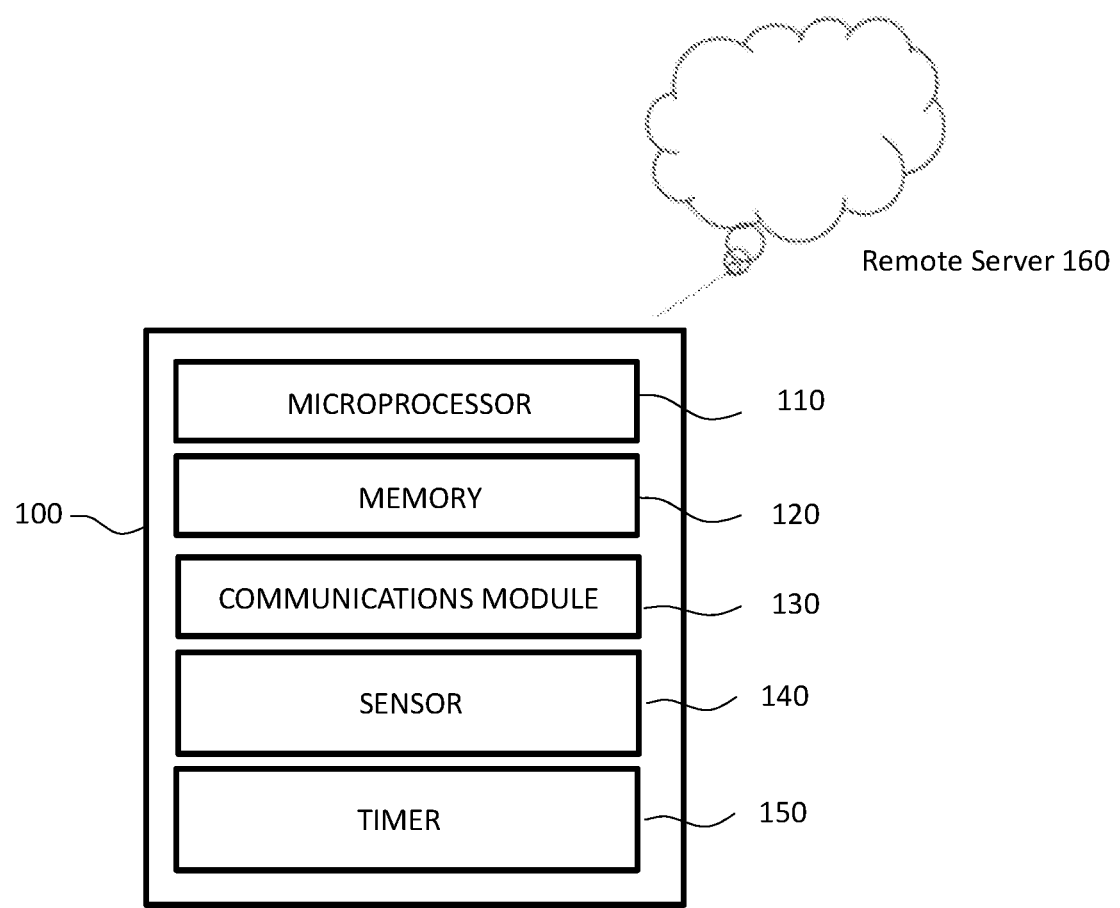
FIG. 1 is a schematic illustration of an apparatus 100 for determining presence and absence.

FIG. 1 is a schematic illustration of an apparatus 100 according to one exemplary embodiment. As shown, the apparatus comprises a processing apparatus in the form of microprocessor 110, a memory 120, a communications module 130, a sensor 140 and a timer 150. The sensor 140 may for example be a motion sensor such as PIR detector, or it could be another type of sensor such as a temperature sensor. As shown, the communications module 130 is in communication with remote server 160 and in particular is configured to store data in a database stored on the remote server 160.

The microprocessor no has a number of deep sleep configurations.

In a first deep sleep configuration, the microprocessor no will be woken up from deep sleep by a signal from the sensor, or on expiry of the timer, whichever happens first. In the first deep sleep configuration the timer may be initially set to a predetermined duration which may be referred to herein as "sensing time".

The first deep sleep configuration is entered by 1) setting the microprocessor to a mode in which it is responsive to a sensor or a timer, 2) setting the timer to "sensing time", and 3) putting the microprocessor to sleep.

In a second deep sleep configuration, the microprocessor 110 will again be woken up by either a signal from the sensor or expiry of the timer, but the duration of the timer is set so that it does not expire until the end of the current operational period. All of the operations discussed herein occur within the current operational period, which may be several hours long or longer. The duration of the other timers (i.e. the "sensing time" and "sleeping time" timers discussed herein) are much shorter than the current operational period. Thus, in the second deep sleep configuration, the microprocessor 110 will in effect (i.e. within the operational period) only wake up if it receives a signal from the sensor.

The second deep sleep configuration is entered by 1) setting the microprocessor to a mode in which it is responsive to a sensor or a timer, 2) setting the timer to expire at the end of the current operational period, and 3) putting the microprocessor to sleep.

In a third deep sleep configuration, the microprocessor 110 will not be woken up by a signal from the sensor; instead it will only be woken up on expiry of a timer. The duration of this timer may be referred to as "sleeping time". The third deep sleep configuration is entered by 1) setting the microprocessor to a mode in which it is responsive to a timer only, 2) setting the timer to "sleeping time", and 3) putting the microprocessor to sleep.

The microprocessor 110 is further configured to store, in the memory 120, data to indicate whether the microprocessor 110 last responded to a signal from a sensor or expiry of a timer, and data indicating whether, the time before last, the microprocessor 110 last responded to a signal from a sensor or expiry of a timer. In some examples, this is achieved using two variables, which may be referred to as "−1 State" and "−2 State". These variables are updated every time the microprocessor 110 is woken up.

The memory is capable of holding the state information in "−1 State" and "−2 State" during any of the deep sleep configurations.

The labels "−1 State" and "−2 State" refer to the last two "states of detection", respectively. In particular, the variable "−1 State" records what the microprocessor no last responded to and the variable "−2 State" records what the microprocessor no responded to the time before last. If the microprocessor no is woken up by expiration of a timer, then "−1 State" is set equal to 0. If the microprocessor no is woken up by a trigger signal from the sensor, then "−1 State" is set equal to 1. Similarly "−2 State" is set to zero if the microprocessor no was woken up by expiration of a timer the time before last, and "−2 State" is set to one if the microprocessor no was woken up by a signal from the sensor the time before last.

Figure 2:
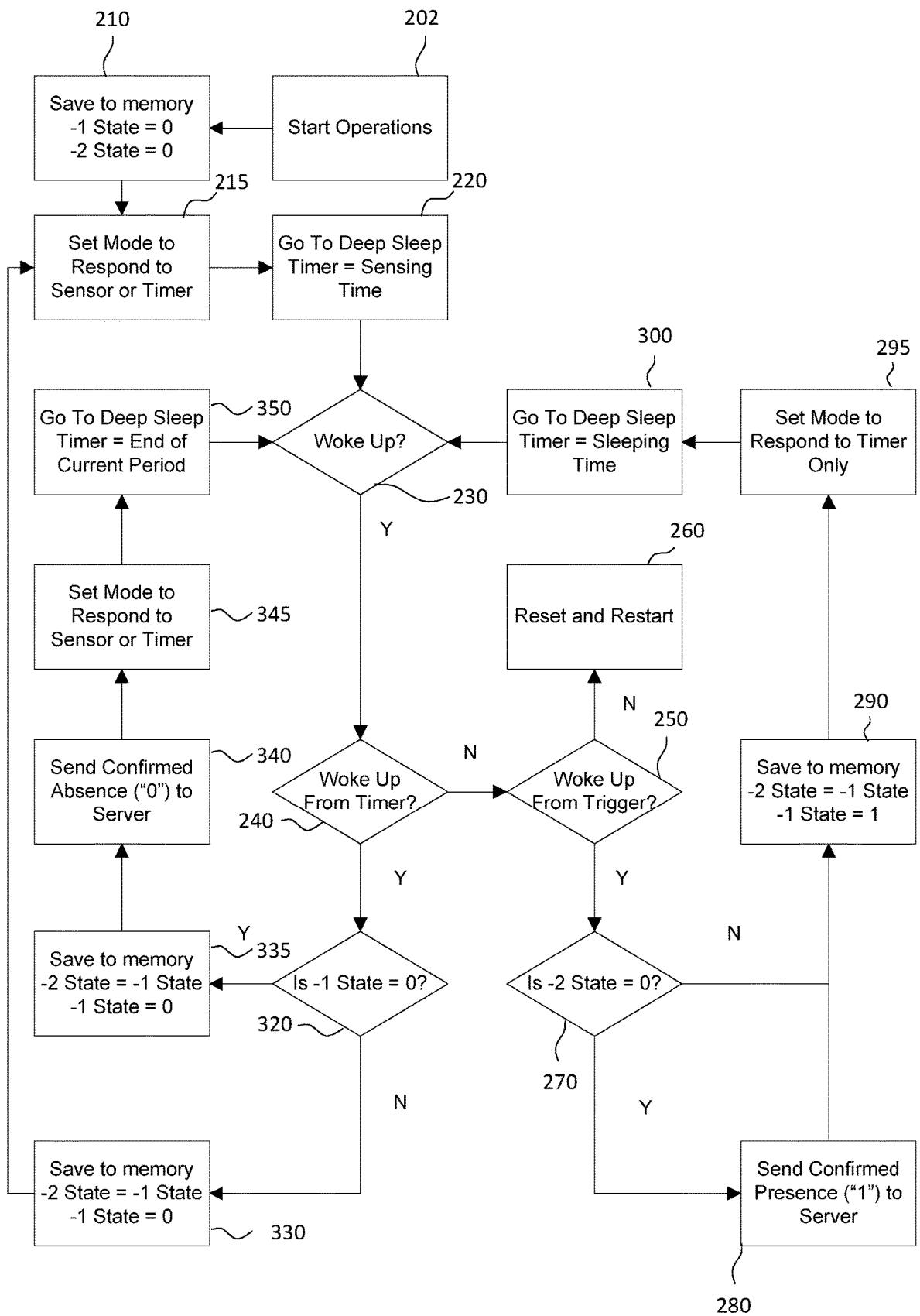
FIG. 2 is a flow chart of operations that may be carried out by a microprocessor.

Various operations performed by the microprocessor no are illustrated in more detail in the flow diagram shown in FIG. 2.

As shown, in block 202, operations are started. In block, 210, the variables "−1 State" and "−2 State" are initialised to zero. In block 215, the microprocessor is set to a mode in which it is responsive to a signal from the sensor, or expiry of the timer. In block 220, the microprocessor no goes to deep sleep with the timer set to "sensing time". Hence, the microprocessor enters the first deep sleep configuration described above.

In block 230, operations are paused until the microprocessor no is woken up. Once the microprocessor no has been woken up, it is determined whether the microprocessor no has woken up due to expiry of a timer (block 240). If not, it is determined (block 250) whether the microprocessor no has woken from a "trigger" (i.e. from a signal from the sensor).

If the microprocessor no has woken up, but not from expiry of a timer or a trigger, then this is an error state and the microprocessor no will reset and restart (block 260).

If it is determined that the microprocessor no has woken up from a trigger, then it is checked whether "−2 State" has the value zero (block 270). If it does, then the microprocessor no causes the communication device to send an indication of a confirmed presence to the server (block 280).

As shown block 290 is reached either following transmittal of a confirmed presence in block 280, or if "−2 State" is 1 in block 270. In block 290, "−2 State" is updated to give it the current value of "−1 State". "−1 State" is then given the value 1. Next, in block 295, the microprocessor is set to a mode in which it is responsive to the timer only (i.e. the microprocessor is set to a mode in which it is not responsive to a signal from the sensor). Then, in block 300, the microprocessor goes to deep sleep with the timer set to "Sleeping time". Hence, the microprocessor no enters the third deep sleep configuration described above. The procedure then returns to block 230, whereupon operations are paused until the microprocessor no is once again woken up.

If, in block 240, it is determined that the microprocessor no has woken up from expiry of a timer, then it is determined whether "−1 State" has the value zero (block 320). If it does not, then "−2 State" is updated to give it the current value of "−1 State" (block 330). "−1 State" is then given the value 0. The procedure then returns, via block 215, to block 220, thereby entering the first deep sleep configuration.

If it is determined in block 320 that "−1 State" does have the value zero, then the operations of block 335 are executed. In block 335, "−2 State" is updated to give it the current value of "−1 State", and "−1 State" is then given the value 0. Then, the microprocessor no causes the communication device to send a confirmed absence to the server (block 340). Next, in block 345, the microprocessor is set to a mode in which it is responsive to a signal from the sensor, or to expiry of the timer. Then, in block 350, the microprocessor no goes to deep sleep with the timer set to the end of the current operational period. Hence, the microprocessor no enters the second deep sleep configuration described above. Since the current operational period is relatively long, the microprocessor will, within this period, only wake up if it receives a signal from the sensor. The procedure then returns to block 230, whereupon operations are paused until the microprocessor no is woken up.

Consider an example in which the sensor is a PIR detector, for example, which senses the presence of one or more individuals. Consider the situation in which operations are started and the sensor is not activated because no one is present. In this case the microprocessor no initialises "−1 State" and "−2 State" to zero (block 210) and enters the first deep sleep configuration (215, 220). Hence the microprocessor will wake up in response to either a signal from the sensor or expiry of the timer. Operations are then paused in block 230 until the microprocessor no is woken up. Since no one is present the microprocessor no will not wake up until the timer (of duration="Sensing Time") has expired. The procedure then reaches block 320. Since "−1 State" is zero, the operations of block 335 are executed. "−2 State" and "−1 State" are not changed by these operations and thus both remain with the value zero. A confirmed absence is then sent to the server (block 340). The microprocessor no enters the second deep sleep configuration (345, 350) and so will only wake up within the current operational period if it receives a signal from a sensor. Operations then pause at block 230 until a signal is received from the sensor. Therefore, no unnecessary further "absence" signals are sent to the remote server 16o, thereby reducing signal traffic and power requirements. The microprocessor no is now in a state in which it is "primed" to react to a signal from the sensor.

Suppose now that an individual enters the occupancy space and is detected by the PIR detector. The microprocessor no is woken up in response to receiving a signal from the PIR detector. Hence, the procedure continues via blocks 240 and 250 to block 270.

Since "−2 State" is 0, a confirmed presence is sent to the server (block 280). In block 290, "−2 State" remains unchanged and "−1 State" is updated to 1. Hence the combined state information, which for ease of notation may be represented by the vector ("−1 State", "−2 State"), is (1, 0).

The procedure then continues via block 295, to block 300, so that the microprocessor no enters the third deep sleep configuration. As described above, in this mode the microprocessor no will not be woken up by a signal from the sensor; instead it will only be woken up on expiry of a timer. The procedure then returns to block 230, whereupon operations are paused until the microprocessor no is woken up on expiry of the timer.

When it is woken up on expiry of a timer, the procedure then continues, via block 240, to block 320. Then, since "−1 State" is 1, the procedure continues to block 330, whereupon "−2 State" is given the value 1 (since this is the value of "−1 State"), and "−1 State" is set equal to zero. Therefore, after block 330, the combined state information is (0, 1).

Operations then continue to block 220 and the microprocessor no enters the first deep sleep configuration. If the individual is still present, the microprocessor no will then be woken up by a signal from the sensor and the procedure continues, via blocks 230, 240 and 250, to block 270. Since "−2 State" is 1, the procedure continues directly to block 290, i.e. a second confirmation of presence is not sent.

In block 290, "−2 State" is given the value 0 (since this is the value of "−1 State"), and "−1 State" is set equal to 1. Thus, the combined state information is again becomes (1, 0). The procedure then returns to block 300 such that the microprocessor no enters the third deep sleep configuration again. If the individual is still present, then the operations described above repeat.

Thus, while an individual is present, the combined state information "flip-flops" between (0, 1) and (1, 0), but no additional "presence" signals are sent to the remote server 160, thereby reducing signal traffic and power requirements.

Consider now what happens when the individual leaves. Since the microprocessor 110 will not then be woken up from a signal from the sensor, operations pause at block 230 until the "sensing time" timer expires. Then, operations continue via block 240 to block 320. The combined state information at this point could either be (0, 1) or (1, 0), but in either case a confirmed absence will be sent, as will now be explained.

If the state is (0, 1) at block 320, then it will be updated to (0, 0) in block 335 and a confirmed absence will be sent (block 340) straight away.

If, on the other hand the state at block 320 is (1, 0) then it will be updated to (0, 1) in block 330 and the procedure continues, via block 220, to block 230. Assuming the individual does not return before the timer expires, the procedure will continue via block 240 to block 320. Since the state is (0, 1) it will be updated to (0, 0) in block 335 and a confirmed absence will be sent (block 340).

From block 340, the procedure then continues to block 345 and 350, whereupon the microprocessor no enters the second deep sleep configuration (timer set to expire at the end of the current operational period). The procedure continues to block 230, where it pauses until the microprocessor no is woken up in response to a signal from the PIR.

Hence the microprocessor no is now once again in a state in which it is "primed" to detect the presence of an individual. Advantageously, only one confirmed absence signal has been sent, thereby reducing signal traffic and power requirements.

As will be understood from the foregoing, in various embodiments, the methods and apparatuses described herein obviate the need to periodically monitor the signal that is output from a sensor to detect the end of presence. Instead of repeatedly sending presence/absence signals whenever a presence/absence is determined, a single signal is sent to confirm presence and a single signal is sent to confirm absence.

More specifically, only when the "−2 State" variable has the value zero after the microprocessor no is woken up by a signal from the sensor is a confirmed presence sent to the server. Only when the "−1 State" variable has the value zero after the microprocessor no is woken up by the end of a timer is a confirmed absence sent to the server.

This approach eliminates the need to "continuously pulse" the space for determining presence/absence and thus significantly reduces the number of signals sent to the server, thereby reducing signal traffic and power requirements.

The processing apparatus no described herein may be of any suitable composition and may include one or more processors of any suitable type or suitable combination of types. For example, the processing apparatus no may be a programmable processor that interprets computer program instructions and processes data. The processing apparatus no may include plural programmable processors. Alternatively, the processing apparatus may be, for example, programmable hardware with embedded firmware. The processing apparatus no may alternatively or additionally include one or more specialised circuit such as field programmable gate arrays FPGA, Application Specific Integrated Circuits (ASICs), signal processing devices etc.

The processing apparatus no is coupled to the memory 120 and is operable to read/write data to/from the memory 120. The memory 120 may comprise a single memory unit or a plurality of memory units, upon which the computer readable instructions (or code) is stored. For example, the memory 120 may comprise both volatile memory and non-volatile memory. In such examples, the computer readable instructions/program code may be stored in the non-volatile memory and may be executed by the processing apparatus no using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

Many modifications and variations of the embodiments described herein will be evident to those skilled in the art, that fall within the scope of the following claims:

The invention claimed is:

1. A method of operating an apparatus to determine presence and absence of one or more individuals in an occupancy space, the apparatus comprising a processing apparatus having at least two modes, wherein in each said mode the processing apparatus is responsive to a signal from a sensor and/or responsive to expiry of a timer, the processing apparatus being configured to store data in first and second variables, the first variable being adapted to store an indication of whether the processing apparatus responded to a signal from a sensor or to expiry of a timer, and the second variable being adapted to store an indication of whether, at an earlier time, the processing apparatus responded to a signal from a sensor or to expiry of a timer, the method comprising:
   performing a first set of operations if the processing apparatus responds to a signal from a sensor, and performing a second set of operations if the processing apparatus responds to expiry of a timer,
   wherein the first set of operations comprises:
      causing data indicating a detected presence to be transmitted and/or stored, if data in the second variable indicates that the processing apparatus responded to expiry of a timer;
      storing, in the second variable, data stored in the first variable;
      storing, in the first variable, data indicating that a signal form a sensor was responded to; and
      entering a mode in which the processing apparatus is responsive to expiry of a timer.

2. The method of claim 1, wherein the first variable is adapted to store an indication of whether the processing apparatus last responded to a signal from a sensor or expiry of a timer, and the second variable is adapted to store an indication of whether, the time before last, the processing apparatus responded to a signal from a sensor or expiry of a timer.

3. The method of claim 1, further comprising causing the apparatus to transmit and/or store data indicating a detected absence, if:
   the processing apparatus responds to a expiry of a timer; and
   data stored in the first variable indicates that the processing apparatus last responded to expiry of a timer.

4. The method of claim 1, wherein the second set of operations comprise:

if data in the first variable indicates that a signal from a sensor was responded to, then:
  storing, in the second variable, data stored in the first variable;
  storing, in the first variable, data indicating that expiry of a timer was responded to; and
  entering a mode in which the processing apparatus is responsive to a signal from a sensor and responsive to expiry of a timer;
if data in the first variable indicates that expiry of a timer was responded to, then:
  storing, in the second variable, data stored in the first variable;
  storing, in the first variable, data indicating that expiry of a timer was responded to;
  causing data indicating an absence to be transmitted and/or stored; and
  entering a mode in which the processing apparatus is responsive to a signal from a sensor.

5. The method of claim 1, comprising storing first data in the first variable if the processing apparatus has responded to expiry of a timer, and storing second data, different from the first data, in the first variable if the processing apparatus has responded to a signal from a sensor, wherein the first variable and second variable are initialised such that the first and second variable each comprise the first data.

6. The method of claim 1, wherein the data indicating a presence and/or data indicating an absence is transmitted to a remote server.

7. An apparatus for determining presence and absence of one or more individuals in an occupancy space, the apparatus comprising a processing apparatus having at least two modes, wherein in each said mode the processing apparatus is responsive to a signal from a sensor and/or responsive to expiry of a timer, the processing apparatus being configured to store data in a first variable to indicate whether the processing apparatus responded to a signal from a sensor or expiry of a sensor, and to store data in a second variable to indicate whether the processing apparatus responded, at an earlier time, to a signal from a sensor or to expiry of a timer, wherein the processing apparatus is configured to:
  perform a first set of operations if the processing apparatus responds to a signal from a sensor, and perform a second set of operations if the processing apparatus responds to expiry of a timer, and
  transmit and/or store data indicating a detected absence, if:
  the processing apparatus responds to a expiry of a timer; and
  data stored in the first variable indicates that the processing apparatus last responded to expiry of a timer;
  wherein the first set of operations includes causing data indicating a detected presence to be transmitted, if data in the second variable indicates that expiry of a timer was responded to.

8. The apparatus of claim 7, further comprising a communication device configured for transmitting data indicating a detected presence or a detected absence to a remote server.

9. The apparatus of claim 7, wherein the processing apparatus comprises a microprocessor.

10. The apparatus of claim 7 further comprising a sensor.

11. The apparatus of claim 7, wherein the sensor is a passive infrared detector.

12. The apparatus of claim 8, wherein the processing apparatus comprises a microprocessor.

13. The apparatus of claim 8 further comprising a sensor.

14. A method of operating an apparatus to determine presence and absence of one or more individuals in an occupancy space, the apparatus comprising a processing apparatus having at least two modes, wherein in each said mode the processing apparatus is responsive to a signal from a sensor and/or responsive to expiry of a timer, the processing apparatus being configured to store data in first and second variables, the first variable being adapted to store an indication of whether the processing apparatus responded to a signal from a sensor or to expiry of a timer, and the second variable being adapted to store an indication of whether, at an earlier time, the processing apparatus responded to a signal from a sensor or to expiry of a timer, the method comprising:
  performing a first set of operations if the processing apparatus responds to a signal from a sensor, and performing a second set of operations if the processing apparatus responds to expiry of a timer,
  wherein the first set of operations includes causing data indicating a detected presence to be transmitted and/or stored, if data in the second variable indicates that the processing apparatus responded to expiry of a timer, and
  wherein the first variable is adapted to store an indication of whether the processing apparatus last responded to a signal from a sensor or expiry of a timer, and the second variable is adapted to store an indication of whether, the time before last, the processing apparatus responded to a signal from a sensor or expiry of a timer.

15. The method of claim 14, further comprising causing the apparatus to transmit and/or store data indicating a detected absence, if:
  the processing apparatus responds to a expiry of a timer; and
  data stored in the first variable indicates that the processing apparatus last responded to expiry of a timer.

16. The method of claim 14, wherein the first set of operations further comprises:
  storing, in the second variable, data stored in the first variable;
  storing, in the first variable, data indicating that a signal from a sensor was responded to; and
  entering a mode in which the processing apparatus is responsive to expiry of a timer.

17. The method of claim 14, wherein the second set of operations comprise:
  if data in the first variable indicates that a signal from a sensor was responded to, then:
    storing, in the second variable, data stored in the first variable;
    storing, in the first variable, data indicating that expiry of a timer was responded to; and
    entering a mode in which the processing apparatus is responsive to a signal from a sensor and responsive to expiry of a timer;
  if data in the first variable indicates that expiry of a timer was responded to, then:
    storing, in the second variable, data stored in the first variable;
    storing, in the first variable, data indicating that expiry of a timer was responded to;
    causing data indicating an absence to be transmitted and/or stored; and
    entering a mode in which the processing apparatus is responsive to a signal from a sensor.

18. The method of claim 14, comprising storing first data in the first variable if the processing apparatus has responded to expiry of a timer, and storing second data, different from the first data, in the first variable if the processing apparatus has responded to a signal from a sensor, wherein the first variable and second variable are initialised such that the first and second variable each comprise the first data.

19. The method of claim 14, wherein the data indicating a presence and/or data indicating an absence is transmitted to a remote server.

\* \* \* \* \*